United States Patent
Bellamy

(10) Patent No.: US 11,865,596 B2
(45) Date of Patent: Jan. 9, 2024

(54) METHOD FOR RESTORING ACIDIC OR SODIC ALKALI SOILS IN A CONTAMINATED SITE

(71) Applicant: VRM International Pty Ltd, Bohle (AU)

(72) Inventor: Kenneth Michael Bellamy, Townsville (AU)

(73) Assignee: VRM International Pty Ltd., Bohle (AU)

( * ) Notice: Subject to any disclaimer, the term of this patent is extended or adjusted under 35 U.S.C. 154(b) by 94 days.

(21) Appl. No.: 16/887,254

(22) Filed: May 29, 2020

(65) Prior Publication Data
US 2021/0370368 A1    Dec. 2, 2021

(51) Int. Cl.
*B09C 1/08*    (2006.01)
*B09C 1/10*    (2006.01)
*C05F 17/00*    (2020.01)

(52) U.S. Cl.
CPC .............. *B09C 1/08* (2013.01); *B09C 1/10* (2013.01); *C05F 17/00* (2013.01)

(58) Field of Classification Search
CPC .............. C05F 17/00; B09C 1/08; B09C 1/10
See application file for complete search history.

(56) References Cited

U.S. PATENT DOCUMENTS

| | | | |
|---|---|---|---|
| 3,497,139 A * | 2/1970 | Hermann | A01C 23/001 239/223 |
| 4,026,476 A * | 5/1977 | Ipnar | A01C 3/066 239/680 |
| 4,052,818 A | 10/1977 | Hagerty | |
| 6,497,534 B1 | 12/2002 | McCoy | |
| 6,719,902 B1 | 4/2004 | Alvarez et al. | |
| 7,455,774 B2 | 11/2008 | Chandraghatgi et al. | |
| 7,585,132 B2 | 9/2009 | Imbrie | |

(Continued)

FOREIGN PATENT DOCUMENTS

| AU | 2012283757 B2 | 1/2013 |
|---|---|---|
| AU | 2012283757 B2 | 11/2014 |

(Continued)

OTHER PUBLICATIONS

"Groundswell(r) Continuous Fermentation Process Manual" published by VRM International (Year: 2015).*

(Continued)

*Primary Examiner* — Janine M Kreck
(74) *Attorney, Agent, or Firm* — Cooper Legal Group LLC

(57) ABSTRACT

A method for restoring a contaminated site comprising the steps of: undertaking an amendment of a contaminated site by applying a first catalyst and a second catalyst to the contaminated site; and incorporating the first catalyst and the second catalyst into a soil on the contaminated site to form an amended contaminated site, wherein the contaminated site has excessive acidity, alkalinity and/or sodic contamination, wherein amending the contaminated site with the first catalyst and the second catalyst assists in the restoration of the amended contaminated site by transferring a biological energy generation mechanism to the amended contaminated site which improves the capacity of the amended contaminated site to balance a hydrogen cycle and hydrogen exchange between biotic and abiotic sources.

8 Claims, 6 Drawing Sheets

(56) References Cited

U.S. PATENT DOCUMENTS

| | | |
|---|---|---|
| 8,114,659 B2 | 2/2012 | Rawson et al. |
| 8,689,819 B2 | 4/2014 | Hashimoto et al. |
| 9,034,633 B2 | 5/2015 | Kumar et al. |
| 9,175,258 B2 | 11/2015 | Bywater-Ekegard et al. |
| 9,212,358 B2 | 12/2015 | Razavi-Shirazi et al. |
| 10,004,188 B2 | 6/2018 | Williams et al. |
| 10,531,615 B2 | 1/2020 | Jimenez Santillana et al. |
| 10,906,075 B2 | 2/2021 | Franssen et al. |
| 10,973,184 B1 | 4/2021 | Yin |
| 11,623,257 B2 | 4/2023 | Bellamy |
| 2002/0088177 A1 | 7/2002 | Gergek |
| 2005/0000903 A1 | 1/2005 | Mecs et al. |
| 2006/0130546 A1 | 6/2006 | Beaton et al. |
| 2010/0227381 A1 | 9/2010 | Hoag et al. |
| 2012/0085024 A1 | 4/2012 | Leung |
| 2014/0329677 A1 | 11/2014 | Anisimova et al. |
| 2015/0093199 A1 | 4/2015 | Borden et al. |
| 2017/0305804 A1 | 10/2017 | Ayers et al. |
| 2019/0297799 A1 | 10/2019 | Larue |
| 2020/0079672 A1 | 3/2020 | Noland |
| 2021/0368691 A1 | 12/2021 | Bellamy |
| 2023/0082338 A1 | 3/2023 | Bellamy |

FOREIGN PATENT DOCUMENTS

| | | |
|---|---|---|
| AU | 2014250680 A1 | 5/2015 |
| AU | 2014250680 B2 | 5/2015 |
| CN | 1269738 A | 10/2000 |
| CN | 1413963 A | 4/2003 |
| CN | 106914484 A | 7/2017 |
| CN | 107646227 A | 2/2018 |
| CN | 107841313 A | 3/2018 |
| CN | 108934251 A | 12/2018 |
| CN | 109679662 A | 4/2019 |
| CN | 110125169 A | 8/2019 |
| CN | 110252798 A | 9/2019 |
| CN | 110326462 A | 10/2019 |
| CN | 210017104 U | 2/2020 |
| EP | 2856859 B1 | 7/2016 |
| JP | 2003325052 A | 11/2003 |
| KR | 101363010 B1 | 2/2014 |

OTHER PUBLICATIONS

Soil Acidity and Liming: Basic Information for Farmers and Gardeners | NC State Extension Publications (Year: 2018).*

Innovative Agriculture Products Experimentations—The Patatas—An Education Solutions Consultancy. https://www.thepatatas.com/experimenting-with-innovative-agriculture-products accessed Aug. 17, 2022 (Year: 2017).*

K. Bellamy, "Photosynthesis: Fixing Carbon and Making Water", Ken Bellamy, 2009, pp. 1-6, <https://nanopdf.com/download/photosynthesis-fixing-carbon-and-making-water-6co2-12h2o_pdf>.

Corresponding CNIPA Office Action for Chinese Application No. 202010476944.1, dated Jun. 6, 2022, 16 pages.

Australian Examination Report for Australian Application No. 2020203536, dated Jun. 23, 2022, 7 pages.

Chang, et al.: "Effect of different types of organic fertilizers on the chemical properties and enzymatic activities of an Oxisol under intensive cultivation of vegetables for 4 years", Soil Science and Plant Nutrition (2008) 54, 587-599, 13 pages.

Australian Examination Report for Australian Application No. 2020203537, dated Aug. 5, 2022, 5 pages.

Chinese Office Action for Chinese Application No. 202010475251.0, dated Aug. 2, 2022, 15 pages.

Australian Examination Report for Australian Application No. 2020203535, dated Aug. 5, 2022, 5 pages.

VRM International Pty Ltd., VRM Operations (South Asia) Pte Ltd., VRM Biologik Sdn Bhd: "Groundswell Continuous Fermentation Process Manual", VRM Biologik, www.vrm.science, 2015, 16 pages.

* cited by examiner

METHOD FOR RESTORING ACIDIC OR SODIC ALKALI SOILS IN A CONTAMINATED SITE

TECHNICAL FIELD

The present invention relates to a method for restoring a contaminated site. Specifically, the present invention relates to a method for restoring a contaminated site having excessive acidity, alkalinity and/or sodic contamination.

BACKGROUND ART

Nutrient depletion, excessively high or low pH levels, or sodicity in soils adversely affects soil quality and water quality and reduces crop yield and consequently poses a potential threat to global food security and agricultural sustainability. Soils can become depleted of nutrients, acid or alkaline or sodic through over tillage, erosion, leaching or through inadequate replenishment of nutrients. Nutrient depletion, excessively high or low pH levels, or sodicity has been observed in soils in fields, paddies, orchards, and the like. Further contamination of soils, in particular of metal contamination, may lead to nutrient depletion and/or accumulation of metals which may bioaccumulate through the food chain.

Nutrient storage in naturally formed soils is primarily ensconced in humus—a dynamically manufactured substance which characterises fertile soils and which is largely responsible for the initial adsorption and subsequent dissipation of contaminants. Humus is also a primary repository for moisture storage in soils. The depletion of soils globally is thus a simple function of practices and processes which deplete both stored reserves of humus and the natural mechanisms by which humus is dynamically maintained. A key symptom of depleted soil is desiccation—the loss over time of soil moisture reserves which leads eventually to desertification. Systems which naturally store nutrients in soil also store water. Where water storage capacity declines, evapotranspiration results in drying of soil. In addition, systems responsible for the manufacture and maintenance of humus reserves in soil are also responsible for the biological manufacture of water or hydrosynthesis. It will be understood that the term "hydrosynthesis" is intended to refer to a process which enables the biological manufacture of water and assists in the maintenance of soil moisture reserves. Where symptomatic soil degradation has occurred, desiccation and desertification follow. Further, depleted soils also frequently display contamination with excessive acidity, alkalinity and/or sodic levels.

Traditionally, fertilisers have been added to nutrient depleted soils to assist in managing nutrient supply to crops. However, the addition of fertilisers to a depleted soil can accelerate soil depletion and does not of itself contribute to the rebuilding of soil nutrient reserves. In addition, key nutrients such as phosphorus, are a finite resource and are expensive to process and deliver. Phosphorus added annually to a depleted soil results in rapid locking up of the applied nutrient in a form unavailable for plant growth. Phosphorus availability requires the presence of water. Where soils are depleted and desiccation occurs, phosphorus lock-up is accentuated. Further, with the onset of global warming and shifting weather patterns, there is a concern that more intense and longer droughts will accelerate desiccation of soils and further reduce global agricultural productivity. Traditionally, addition of gypsum, maintaining adequate vegetation cover, leaf litter or stubble on the soil surface, and crop selection have been used to assist in replacing sodium in sodic soils with calcium. Traditionally, addition of lime, sulphur, or organic material have been used to assist in managing excessive acidity or alkalinity in soils.

All and any substances which are biologically manufactured or derived are completely dependent upon the capture either directly or indirectly of solar energy. The efficiency of any process resulting in creation of an organic molecule used in a biological structure is a function of the level of efficiency of the mechanism used to capture and store solar energy which underpins the formation of that organic molecule. It follows then that the manufacture of organic molecules used to construct humus and maintain humus reserves in soil and the biological reactions which result in hydrosynthesis rely upon sustained harvesting, storage and transfer of solar energy.

Thus, there would be an advantage if it were possible to provide a sustainable method that not only replenished nutrient reserves and overall soil moisture levels and water storage capacity in a contaminated site, but also improved the on-going capacity of a soil in the contaminated site to capture, store and transfer solar energy and balance hydrogen compounds which underpin the acidity, alkalinity or sodic contamination of a contaminated site.

It will be clearly understood that, if a prior art publication is referred to herein, this reference does not constitute an admission that the publication forms part of the common general knowledge in the art in Australia or in any other country.

SUMMARY OF INVENTION

The present invention is directed to a method for restoring a contaminated site which may at least partially overcome at least one of the abovementioned disadvantages or provide the consumer with a useful or commercial choice.

With the foregoing in view, the present invention in one form, resides broadly in a method for restoring a contaminated site comprising the steps of:

(a) Undertaking a primary amendment of a contaminated site with a first catalyst and a second catalyst, wherein the first catalyst and the second catalyst are applied to at least a portion of the contaminated site such that a matrix of biological energy generation points are constructed on about 5% of the contaminated site by area;

(b) Undertaking a secondary amendment of the contaminated site with the first catalyst and the second catalyst, wherein the first catalyst and the second catalyst are applied to at least a portion of the contaminated site such that a matrix of biological energy generation points are constructed on about 20% of the contaminated site by area, and (c) Undertaking a tertiary amendment of the contaminated site with the first catalyst and the second catalyst, wherein the first catalyst and the second catalyst are applied to at least a portion of the contaminated site such that a matrix of biological energy generation points are constructed on about 75% of the contaminated site by area, wherein the contaminated site is a site that has excessive acidity, alkalinity and/or sodic contamination, and wherein the primary amendment, the secondary amendment and the tertiary amendment of the contaminated site are each conducted at least once.

The term "catalyst" as used herein is broadly defined as a substance that produces or generates a reaction regardless of whether it undergoes a change itself.

The term "amendment" as used herein is broadly defined as a process or action that leads to a change in the condition of the land, including a physical change, a chemical change, a biological change, or any suitable combination thereof.

The term "site" as used herein, and with reference to FIG. 1, is broadly defined as a three-dimensional space which includes the surface of the soil, the contiguous atmosphere above the soil and the three dimensional area of the soil below the surface of the soil. Preferably, the site may be defined as being an area which includes the surface of soil, the contiguous atmosphere immediately above the soil to a height above the surface of the soil of approximately 1 metre and the three dimensional area of the soil to a depth of about 100 mm below the surface of the soil.

Any suitable type of site may be amended. Preferably, however the site to be amended may be a contaminated site. In this instance, it will be understood that a contaminated site may be a site having excessive acidity, alkalinity and/or sodic contamination. For instance, the contaminated site may be arable land, non-arable land, pasturable land, meadows, grassland, agricultural land, farmland, orchards, plantations, forests, bush or scrub land, park land, residential land, commercial site, construction site, golf courses, athletics fields, race courses, wetlands, water courses and bodies, land-based aquaculture facilities, rehabilitation sites, remediation sites, restoration site, revegetation site, fire-affected sites, mine sites, landfill, waste dumps, commercial composting facilities, on-farm composting facilities, or the like. In this instance, it will be understood that amending the contaminated site in effect amends the three-dimensional space including the surface of the soil, the contiguous atmosphere above the soil and the three-dimensional area of the soil below the surface of the soil. For instance, amending farmland may in effect amend the surface of the soil, any features on the surface of the soil (such as, but not limited to, a land formation, a water course or body, a compost pile, a hay bale, vegetation, or the like), the three dimensional area of the soil below the surface of the soil, any features in the soil (such as, but not limited to, an underground water course or body, a compaction layer, a clay layer, or the like) and the contiguous atmosphere above the surface of the soil being amended.

The method of the present invention provides a method for restoring a contaminated site. In a preferred embodiment of the invention, the method of the present invention provides a method for improving the on-going capacity of a soil to balance hydrogen compounds. Preferably, the method of the present invention provides a method for restoring a contaminated site, wherein amending a contaminated site with a first catalyst and a second catalyst facilitates the on-going capacity of the soil to balance hydrogen compounds. Preferably, amending a contaminated site with a first catalyst and a second catalyst facilitates the transfer of a biological energy generation mechanism to the contaminated site. In a preferred embodiment, the biological energy generation mechanism comprises the capture of solar energy outside the spectral range used by plants by one or more photosynthetic bacteria and the subsequent storage of the captured energy as an organic molecule. It will be understood that the solar energy is initially stored as chemical energy transfer compounds (such as ATP and NADPH), which are subsequently used by photosynthetic organisms to build other compounds rich in hydrogen (such as carbohydrates, proteins and water) which act as both energy storage compounds and nutrient storage compounds.

It will be understood that the biological energy generation process may trigger a nutrient accumulation process, including, but not limited to, nitrogen and carbon sequestration, and subsequently results in the formation of a humified soil, wherein the humified soil may be an energy storage compound and a nutrient storage compound which is not negatively impacted by either an excess or a deficit of available hydrogen ions or by sodic contamination. In use, it is envisaged that the improved nutrient storage and water storage capacity resulting from the development of a humified soil may assist in the absorption and management of contaminants, including contamination arising from an imbalance in hydrogen ions and/or sodicity.

Preferably, the method for restoring a contaminated site may improve the on-going capacity of a soil to balance hydrogen compounds. In this instance, it will be understood that the capacity of a soil to balance hydrogen compounds may refer to its ability to balance the hydrogen cycle and hydrogen exchange between biotic and abiotic sources.

In use, it is envisaged that the method for restoring a contaminated site may support the development of the local microbiome or ecosystem, such that there may be sufficient stored energy to support the structures needed for a healthy microbiome (such as bacteria, *archaea*, viruses, fungi, protozoa, and the like) and subsequently the organisms interacting with the microbiome (such as humans, plants, animals, earthworms, insects, and the like). In use, it is envisaged that sustained energy generation may improve the ability of the soil microbiome to recover from and/or resist disease. Advantageously, this natural restoration may result in the regeneration of indigenous flora and/or fauna in the site since these are dependent on the environmental conditions and microbiome unique to the site.

In use, it is envisaged that the method for restoring a contaminated site may support biological hydrosynthesis, generating an excess of soil moisture, increasing water storage capacity of the soil and increasing evapotranspiration. In this instance, the excess soil moisture may result in an increase in water flow and subsequently movement of water within the water table. In use, it is envisaged that large scale implementation of the method may increase the likelihood of precipitation and the overall precipitation received in a contaminated site. In use, it is envisaged that the stimulated microbiome triggered by the method includes the flourishing of *Pseudomonas* species and other species which may travel in the atmosphere of the contaminated site and which may cause the seeding of precipitation. In use, it is envisaged that the improved water cycle may help act as a hydrogen and salt buffer and to facilitate the mechanisms for hydrogen balancing which are sought.

In use, it is envisaged that the method for restoring a contaminated site may assist in the restoration of the soil. Restoration of the soil may be indicated by a suitable soil fertility indicator. For instance, the soil fertility indicator may include a chemical indicator (such as cation exchange capacity, electrical conductivity, levels and availability of phosphorus and nitrogen, acidity, and the like), a physical indicator (such as soil texture and structure, wet aggregate stability, available water capacity, water holding capacity, hardness, infiltration rate, and the like) or a biological indicator (such as earthworms, organic matter, organic carbon, soil respiration, soil protein, soil enzymes, and the like). Preferably, the method for restoring a contaminated site may improve one or more of available phosphorus, total phosphorus, calcium availability, water holding capacity, aggregate formation and stabilisation, soil microbiome diversity, or earthworm populations in the soil, may balance acidity or alkalinity levels in the soil, may reduce high sodic levels, may assist in sequestration of nitrogen and/or carbon in the soil, may reduce bioavailability of a metal in a contaminated soil, or any suitable combination thereof. Preferably, the method for restoring a contaminated site may be used to prepare a contaminated site prior to construction on the contaminated site. For instance, the method may be used to reduce the acidity of a soil in a contaminated site prior to laying a concrete slab on the contaminated site.

Preferably, the method for restoring a contaminated site may balance the acidity or alkalinity of the soil. In use, it is envisaged that the method for restoring a contaminated site may balance the acidity or alkalinity of the soil by balancing the hydrogen cycle, buffering the soil pH, facilitating cation exchange, or any suitable combination thereof.

Preferably, the method for restoring a contaminated site may reduce the sodicity of the soil. It will be understood that the term "sodicity" refers to the amount of sodium held in the soil and that a sodic soil is a soil wherein sodium makes up more than about 5% of all cations present in the soil.

The method for restoring a contaminated site comprises the step of undertaking an amendment of a contaminated site with a first catalyst and a second catalyst. Preferably, the first catalyst and the second catalyst may be applied to at least a portion of the contaminated site such that contact between the catalysts and the soil constructs a matrix of biological energy generation points in and/or on the amended contaminated site. In this instance, it will be understood that this method facilitates the transfer of a source of and/or a substrate produced by and which stimulates the activity of the one or more prokaryotic organisms to each point in the matrix, triggering the formation of a humified soil and biological hydrosynthesis and subsequent water generation at each point in the matrix. Over time, it is envisaged that construction of a matrix of biological energy generation points facilitates treatment of a contaminated site and improves the on-going capacity of a soil in the amended contaminated site to balance hydrogen compounds. In use, it is envisaged that this method results in natural nutrient accumulation, including nitrogen and carbon sequestration, balancing the acidity or alkalinity of the soil and/or reducing the impact on plant growth of any excessive sodicity of the soil.

The first catalyst and the second catalyst may be of any suitable form. However, in some embodiments of the invention, it is envisaged that the catalyst may comprise a liquor, a fertiliser (and particularly a biofertilizer) or other high value organic material, a humus or humified soil, an incubated culture, a collected substrate for energy generation, or the like. In some embodiments of the invention, the first catalyst and the second catalyst may be the same type of catalysts or may be of different types. In an embodiment of the invention, the first catalyst and the second catalyst may be the same catalyst.

In an embodiment of the invention, the catalysts may comprise a source of and/or a substrate produced by and which stimulates the activity of the one or more prokaryotic organisms. For instance, the prokaryotic organism may comprise one or more species of *archaea*, one or more species of bacteria, or any suitable combination thereof. The prokaryotic organism may be anerobic, aerobic, autotrophic, heterotrophic, phototrophic, chemotrophic, photosynthetic, or any suitable combination thereof. In a preferred embodiment of the invention, the prokaryotic organisms may include purple non-sulphur producing heterotrophic photosynthetic bacteria, *Lactobacillus* species, yeasts, *Actinomycetes* species, *Nocardia* species, a ray fungi, plankton, chemotrophic bacteria, or an suitable combination thereof.

In an embodiment of the invention, the first catalyst comprises an organic substrate which includes characteristics and elements commonly found in a humified soil. In a preferred embodiment of the invention, the first catalyst comprises a humified soil prepared from the continuous fermentation of an organic material. In an embodiment of the invention, the first catalyst comprises a humified soil prepared from the continuous fermentation of an organic material, wherein the continuous fermentation process comprises a source of and provides a habitat for the sustained activity of low temperature fermentation microorganisms. In a preferred embodiment of the invention, the first catalyst comprises a humified soil prepared from the continuous fermentation of an organic material, wherein the humified soil comprises a viable source of and/or substrates produced by and which stimulate the activity of at least one of an aerobic microorganism, an anaerobic microorganism and a photosynthetic microorganism. Preferably, the first catalyst comprises a humified soil prepared from the continuous fermentation of an organic material, wherein the humified soil comprises a source of and/or substrates produced by and which stimulate the activity of heterotrophic photosynthetic bacteria and/or prokaryotic organisms including either one of *archaea* or bacteria. In an embodiment of the invention, the first catalyst may be an output product produced by the method and/or system described in Australian patent no. 2014250680, the disclosure of which is incorporated herein by reference.

In an embodiment of the invention, the second catalyst comprises a liquid fertiliser. In a preferred embodiment of the invention, the second catalyst comprises a liquid fertiliser prepared from the continuous fermentation of an organic material. In an embodiment of the invention, the second catalyst comprises a liquid fertiliser prepared from the continuous fermentation of an organic material, wherein the liquid fertiliser may be a reconstituted microbial substrate. In an embodiment of the invention, the second catalyst comprises a liquid fertiliser prepared from the continuous fermentation of an organic material, wherein the continuous fermentation process comprises a source and a habitat for the activity of low temperature fermentation microorganisms. In a preferred embodiment of the invention, the second catalyst comprises a liquid fertiliser prepared from the continuous fermentation of an organic material, wherein the liquid fertiliser comprises a viable source of and/or substrates produced by and which stimulate the activity of at least one of an aerobic microorganism, an anaerobic microorganism, a heterotrophic microorganism and a photosynthetic microorganism. Preferably, the second catalyst comprises a liquid fertiliser prepared from the continuous fermentation of an organic material, wherein the liquid fertiliser comprises a source of and/or substrates produced by and which stimulate the activity of heterotrophic photosynthetic bacteria and/or prokaryotic organisms including either one of *archaea* or bacteria. In an embodiment of the invention, the second catalyst may be an output product produced by the method and/or system described in Australian patent no. 2012283757, the disclosure of which is incorporated herein by reference.

Preferably, the method comprises the steps of undertaking a primary amendment of a contaminated site, a secondary amendment of the contaminated site and a tertiary amendment of the contaminated site, wherein the primary amendment, the second amendment and the tertiary amendment of the contaminated site may be conducted over a period of time. The amendment regime may be conducted over any suitable period of time. In an embodiment of the invention, each of the primary amendment of the contaminated site, the secondary amendment of the contaminated site, and the tertiary amendment of the contaminated site may be conducted at least once. In this instance, it will be understood that the amendment regime may be conducted at least once. In a preferred embodiment of the invention, each of the primary amendment of the contaminated site, the secondary amendment of the contaminated site, and the tertiary amendment of the contaminated site may be conducted at least once annually. In this instance, it will be understood that the amendment regime may be conducted at least once annually. However, it will be understood that the amendment regime may be conducted any suitable number of times in order to construct a matrix of biological energy generation points in and/or on the amended contaminated site capable of facilitating sustained energy generation and the generation of energy storage compounds, such as a humified soil, on the contaminated site.

The time period separating the secondary amendment of a contaminated site from the primary amendment of the contaminated site and the time period separating the tertiary amendment of the contaminated site from the secondary amendment of the contaminated site, may be of the same length or of different lengths.

Any suitable number of amendment regimes may be undertaken. However, it will be understood that the number of amendment regimes may vary depending on a number of factors, such as the condition of the contaminated site to be treated and the current and planned future use of the contaminated site. The time period separating a first amendment regime of a contaminated site from a second amendment regime of the contaminated site may be of any suitable length. For instance, a second amendment regime of the contaminated site may be commenced at the conclusion of a growing season of a crop, may be commenced on the basis of one or more soil fertility indicator tests, may be commenced after a predetermined time interval, or any suitable combination thereof.

The first catalyst and the second catalyst may be applied to the contaminated site in any suitable manner. For instance, the first catalyst and the second catalyst may be stored and applied to the contaminated site together, may be stored in separate storage vessels and applied to the contaminated site together, or may be stored in separate storage vessels and applied to the contaminated site independently of one other. In an embodiment of the invention wherein the first catalyst and the second catalyst may be applied to the contaminated site independently of one another, it is envisaged that the first catalyst and the second catalyst may be applied sequentially to the contaminated site or may be applied to the contaminated site at the same time. However, it will be understood that the method of applying the first catalyst and the second catalyst to the contaminated site may vary depending on a number of factors, such as the composition and characteristics of the first and second catalysts, the method of application, the type and size of the contaminated site to be treated, and the treatment regime.

Amendment of a contaminated site may be carried out in any suitable manner. For instance, one or both of the first catalyst and the second catalyst may be sprayed onto the contaminated site, may be drip irrigated, may be furrow irrigated, may be aerially applied, may be broadcasted or spread, or any suitable combination thereof. However, it will be understood that the method of applying the first catalyst and the second catalyst to the contaminated site may vary depending on a number of factors, such as the composition and characteristics of the first and second catalysts, the method of application, the type and size of the contaminated site to be treated, and the treatment regime.

In an embodiment of the invention, one or both of the first catalyst and the second catalyst may be mixed with one or more other substances before the first catalyst and the second catalyst may be applied to the contaminated site. Any suitable substance may be used. For instance, the substance may act as a processing aid for storage and delivery of the catalyst, may facilitate the application of the catalyst to the contaminated site, may facilitate the soil taking up the catalysts, may maintain viability of an organism in the catalyst, increase the available pool of a nutrient in the soil, may stimulate a targeted response in nutrient accumulation, or the like. Any suitable substance may be used. For instance, the additive may comprise an emulsifier, a stabiliser, a wetting agent, a preservative, a surfactant, a mineral, a source of a nutrient, or the like. For instance, a source of calcium may be added to the catalyst to increase the available calcium in the soil. For instance, a source of sugar may be added to the catalyst to improve the fermentative capacity of the soil.

In some embodiments of the invention, the first catalyst and the second catalyst may be applied to at least a portion of the contaminated site. In this instance, it will be understood that the at least a portion of the contaminated site may include the surface of the soil, the contiguous atmosphere above the soil and the three-dimensional area of the soil below the surface of the soil. Any suitable portion of the contaminated site may be amended. For instance, the first catalyst and the second catalyst may be applied to about 5% of the contaminated site by area, about 10% of the contaminated site, about 15% of the contaminated site, about 20% of the contaminated site, about 25% of the contaminated site, about 30% of the contaminated site, about 35% of the contaminated site, about 40% of the contaminated site, about 45% of the contaminated site, about 50% of the contaminated site, about 55% of the contaminated site, about 60% of the contaminated site, about 65% of the contaminated site, about 70% of the contaminated site, about 75% of the contaminated site, about 80% of the contaminated site, about 85% of the contaminated site, about 90% of the contaminated site, about 95% of the contaminated site, about 100% of the contaminated site. In some embodiments of the invention, the portion of the contaminated site amended in a primary amendment, a secondary amendment and a tertiary amendment may be the same amount, or may be different amounts. However, it is envisaged that in use, the portion of the contaminated site amended may vary depending on whether the amendment is a primary, secondary or tertiary amendment.

In an embodiment of the invention, the portion of the contaminated site to be amended may comprise two or more discrete areas of land spaced apart from one another, two or more areas of land, wherein the two or more areas of land may be continuous along at least one edge thereof, or any suitable combination thereof. In a preferred embodiment of the invention, the portion of the contaminated site to be amended may be randomly selected. In this instance, it is envisaged that the portion of the contaminated site to be amended may comprise a combination of discrete areas of land spaced apart from one another and areas of land continuous along at least one edge thereof. However, it will be understood, that the proportion of discrete areas of land spaced apart from one another will decrease as the amount of the contaminated site to be amended increases.

In a preferred embodiment of the invention, during primary amendment of a contaminated site, the first catalyst and the second catalyst may be applied to at least a portion of the contaminated site, such that a matrix of biological energy generation points may be constructed on about 5% of the contaminated site by area. In a preferred embodiment of the invention, the at least a portion of the contaminated site amended during primary amendment may be randomly selected.

In a preferred embodiment of the invention, during a secondary amendment of the contaminated site, the first catalyst and the second catalyst may be applied to at least a portion of the contaminated site, such that a matrix of biological energy generation points may be constructed on about 20% of the contaminated site. In some embodiments of the invention, the secondary amendment of the contaminated site may include the portion of the contaminated site amended by the primary amendment, may not include the portion of the contaminated site amended by the primary amendment, or may overlap with a portion of the contaminated site amended by the primary amendment. In a preferred embodiment of the invention, the at least a portion of the contaminated site amended during the secondary amendment of the contaminated site may include the portion of the contaminated site amended during the primary amendment of the contaminated site.

In a preferred embodiment of the invention, during a tertiary amendment of the contaminated site, the first catalyst and the second catalyst may be applied to at least a portion of the contaminated site, such that a matrix of biological energy generation points may be constructed on about 75% of the contaminated site. In some embodiments of the invention, the tertiary amendment of the contaminated site may include the portion of the contaminated site amended by the primary amendment and/or the secondary amendment, may not include the portion of the contaminated site amended by the primary amendment and/or the secondary amendment, or may overlap with a portion of the contaminated site amended by the primary amendment and/or the secondary amendment. In a preferred embodiment of the invention, the at least a portion of the contaminated site amended during the tertiary amendment of the contaminated site may include the portion of the contaminated site amended during the primary amendment and the secondary amendment of the contaminated site.

In some embodiments of the invention, the portion of the contaminated site to be amended may be randomly selected, or selected according to a predetermined criteria. Preferably, the portion of the contaminated site to be amended may be randomly selected. The portion of the contaminated site to be amended may be the same contaminated site amended during a previous amendment or a contaminated site not previously amended.

The amendment regime enables the construction of a matrix of biological energy generation points in and/or on the amended contaminated site sufficient to facilitate sustained and more efficient energy generation and storage within the contaminated site. Preferably, thinly and randomly spreading the first catalyst and the second catalyst during the primary amendment of the contaminated site results in a random distribution of a source of and/or a substrate produced by and which stimulates the activity of the one or more prokaryotic organisms across the contaminated site, wherein each contact point between the catalysts and the soil becomes a biological energy generation point. In use, it is envisaged that as biological activity at each contact point increases, a matrix of biological energy generation points is constructed. As further amendments to the contaminated site may be undertaken, additional contact points may be created and the matrix of biological energy generation points extended over a larger area and/or increased in density in and/or on the existing amended contaminated site until the biological energy generation process becomes self-sustaining. Over a period of time, it is envisaged that the sustained energy generation process facilitates restoration of a contaminated site and improves the on-going capacity of a soil in the contaminated site to balance hydrogen compounds.

The first catalyst may be applied to the contaminated site at any suitable dose rate. For instance, the first catalyst may be applied to the contaminated site at a dose rate of about 100 kilograms per hectare annually, about 250 kilograms per hectare annually, about 500 kilograms per hectare annually, about 750 kilograms per hectare annually, about 1000 kilograms per hectare annually, about 1250 kilograms per hectare annually, about 1500 kilograms per hectare annually, about 1750 kilograms per hectare annually, about 2000 kilograms per hectare annually, about 2250 kilograms per hectare annually, about 2500 kilograms per hectare annually, about 2750 kilograms per hectare annually, about 3000 kilograms per hectare annually, about 3250 kilograms per hectare annually, about 3500 kilograms per hectare annually, about 3750 kilograms per hectare annually, about 4000 kilograms per hectare annually. In this instance, it will be understood that the dose rate of the first catalyst applied to the contaminated site annually includes the combined amount of the first catalyst applied in the first amendment, the second amendment and the tertiary amendment. In some embodiments of the invention, the amount of the first catalyst applied in a primary amendment, a secondary amendment and a tertiary amendment, may be the same amount or different amounts. However, it is envisaged that in use, the amount of the first catalyst applied during an amendment of a contaminated site may vary depending on whether the amendment is a primary, secondary or tertiary amendment.

The second catalyst may be applied to the contaminated site at any suitable dose rate. For instance, the second catalyst may be applied to the contaminated site at a dose rate of about 5 litres per hectare annually, about 50 litres per hectare annually, about 100 litres per hectare annually, about 150 litres per hectare annually, about 200 litres per hectare annually, about 250 litres per hectare annually, about 300 litres per hectare annually, about 350 litres per hectare annually, about 400 litres per hectare annually, about 450 litres per hectare annually, about 500 litres per hectare annually, about 550 litres per hectare annually, about 600 litres per hectare annually, about 650 litres per hectare annually, about 700 litres per hectare annually, about 750 litres per hectare annually, about 800 litres per hectare annually, about 850 litres per hectare annually, about 900 litres per hectare annually, about 950 litres per hectare annually, about 1000 litres per hectare annually. In this instance, it will be understood that the dose rate of the second catalyst applied to the contaminated site annually includes the combined amount of the second catalyst applied in the first amendment, the second amendment and the tertiary amendment. In some embodiments of the invention, the amount of the second catalyst applied in a primary amendment, a secondary amendment and a tertiary amendment, may be the same amount or different amounts. However, it is envisaged that in use, the amount of the second catalyst applied during an amendment of a contaminated site may vary depending on whether the amendment is a primary, secondary or tertiary amendment.

In some embodiments of the invention, the amount of the first catalyst and the second catalyst applied during amendment of at least a portion of the contaminated site may be substantially similar across each amendment of the amendment regime, wherein the at least a portion of the contaminated site amended may be of a substantially different size across each amendment of the amendment regime. In this instance, the effective dose rate of the primary amendment, secondary amendment and tertiary amendment may be substantially different.

The first catalyst and the second catalyst may be applied to the contaminated site in any suitable ratio relative to one another. For instance, the ratio of the first catalyst to the second catalyst may be about 5:95, about 10:90, about 15:85, about 20:80, about 25:75, about 30:70, about 35:65, about 40:60, about 45:55, about 50:50, about 55:45, about 60:40, about 65:35, about 70:30, about 75:25, about 80:20, about 85:15, about 90:10, about 95:5. In use, it is envisaged that the ratio of the first catalyst to the second catalyst may vary depending on whether the amendment is a primary, secondary or tertiary amendment, the composition of the first catalyst and the second catalyst, and the type of contaminated site to be treated.

In some embodiments of the invention, one or both of the first catalyst and the second catalyst may be applied randomly to at least a portion of the contaminated site. In this instance, it will be understood that portion of the contaminated site to be treated may be selected according to a predetermined criterion and the catalyst applied randomly so as to produce a spread with greater than about 30% coefficient of variation. Alternatively, one or both of the first catalyst and the second catalyst may be applied uniformly to at least a portion of the contaminated site. For instance, the catalyst may be applied to the portion of the contaminated site to be treated in a manner such as to produce a spread with less than about 25% coefficient of variation.

In some embodiments of the invention, one or both of the first catalyst and the second catalyst may be applied to a contaminated site as a top dressing. In some embodiments of the invention, one or both of the first catalyst and the second catalyst may be applied to and then mixed in with the soil on the contaminated site. In some embodiments of the invention, one or more of the steps of undertaking a primary amendment, a secondary amendment and a tertiary amendment of a contaminated site may further comprise applying one or both of the first catalyst and the second catalyst to the contaminated site and mixing the catalyst with the soil on the contaminated site. In use, it is envisaged that mixing the catalyst with the soil on the contaminated site may assist in constructing a three-dimensional matrix of biological energy generation points in and/or on the soil.

In an embodiment of the invention, an amendment regime comprising a primary amendment, a secondary amendment and a tertiary amendment may be undertaken on at least a portion of a contaminated site using a first catalyst, a second catalyst and a third catalyst. The third catalyst may be of any suitable form. However, in some embodiments of the invention, it is envisaged that the catalyst may comprise a liquor, a fertiliser (and particularly a biofertilizer) or other high value organic material, a humus or humified soil, an incubated culture, a collected substrate for energy generation, or the like. In some embodiments of the invention, the third catalyst may be the same type of catalyst as the first catalyst and/or the second catalyst, or may be of different types. In an embodiment of the invention, the third catalyst and first catalyst and/or the second catalyst may be the same catalyst.

In an embodiment of the invention, the third catalyst may comprise a liquid generated by biological hydrosynthesis. For instance, the liquid generated by biological hydrosynthesis may rise in evapotranspiration from the contaminated site and return as precipitation, wherein the precipitation may include rainfall as well as the return of dewfall and humidity during atmospheric inversion events, such as the natural cycle of cooling at the end of the day. In this instance, it will be understood that the third catalyst may be recycled through evapotranspiration and precipitation cycles. The liquid generated by biological hydrosynthesis may circulate through the contaminated site by any suitable method by which water moves through a media. For instance, the liquid may circulate through the contaminated site by capillary action, convection, evapotranspiration, precipitation, or any suitable combination thereof.

In a preferred embodiment of the invention, the liquid generated by biological hydrosynthesis may comprise a source of and/or a substrate produced by and which stimulates the activity of the one or more prokaryotic organisms across the contaminated site. In a preferred embodiment of the invention, the liquid generated by biological hydrosynthesis may facilitate the transfer of a source of and/or a substrate produced by and which stimulates the activity of the one or more prokaryotic organisms across the contaminated site. In this instance, it is envisaged that the migration of the liquid by capillary action through the soil and/or the evapotranspiration of the liquid may facilitate the transfer of a source of and/or a substrate produced by and which stimulates the activity of the one or more prokaryotic organisms. In use, it is envisaged that over time the recycling of the third catalyst through evapotranspiration and precipitation cycles may construct a matrix of biological energy generation points in and/or on the amended contaminated site capable of facilitating sustained energy generation and the generation of energy storage compounds, such as a humified soil, on the contaminated site.

The present invention provides numerous benefits over the prior art. For instance, the application of the catalysts over the contaminated site distributes stored captured energy across the contaminated site and transfers the biological energy generation mechanism to the contaminated site, wherein over time the construction of a matrix of biological energy generation points facilitates treatment of a contaminated site and improves the ongoing capacity of a soil in the contaminated site to balance hydrogen compounds. In addition, the method supports the development and health of the soil microbiome and assists in the restoration of the soil by balancing the acidity or alkalinity of the soil and/or reducing the impact on plant growth of excessive sodicity of the soil.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
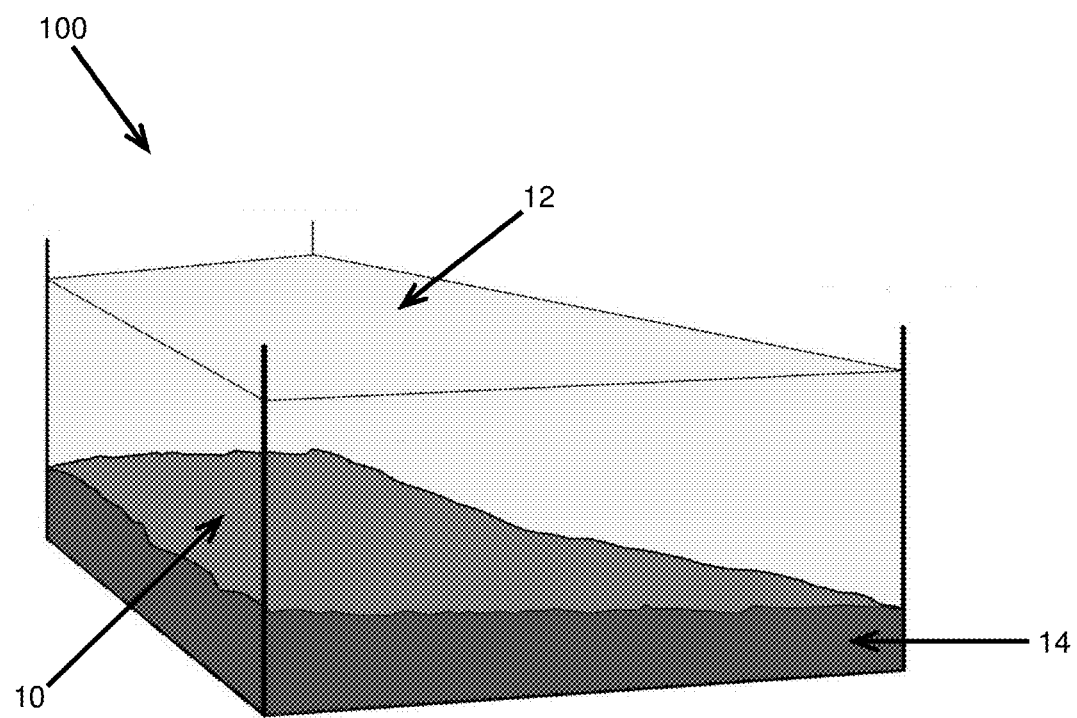
FIG. 1 illustrates a three-dimensional space defined as a site according to an embodiment of the invention.

In FIG. 1, a three-dimensional space defined as a site 100 according to an embodiment of the invention is illustrated. Site 100 may be defined as being a three-dimensional space which includes the surface of the soil 10, the contiguous atmosphere above the soil 12 and the three-dimensional area of the soil below the surface of the soil 14. In use it is envisaged that the first catalyst (not shown) and the second catalyst (not shown) may be applied to at least a portion of the site 100, wherein the at least a portion of the site 100 may include the surface of the soil 10, the contiguous atmosphere above the soil 12 and the three dimensional area of the soil below the surface of the soil 14. For instance, the catalysts (not shown) may be applied to the site 100 as a spray, wherein the liquid droplets may be dispersed through the contiguous atmosphere above the soil 12 and onto the soil surface 10 where they subsequently migrate into or, are tilled into, the soil body 14. In this way, it is envisaged that applying the first catalyst and the second catalyst to at least a portion of the site constructs a matrix of biological energy generation points in and/or on the site.

Figure 2:
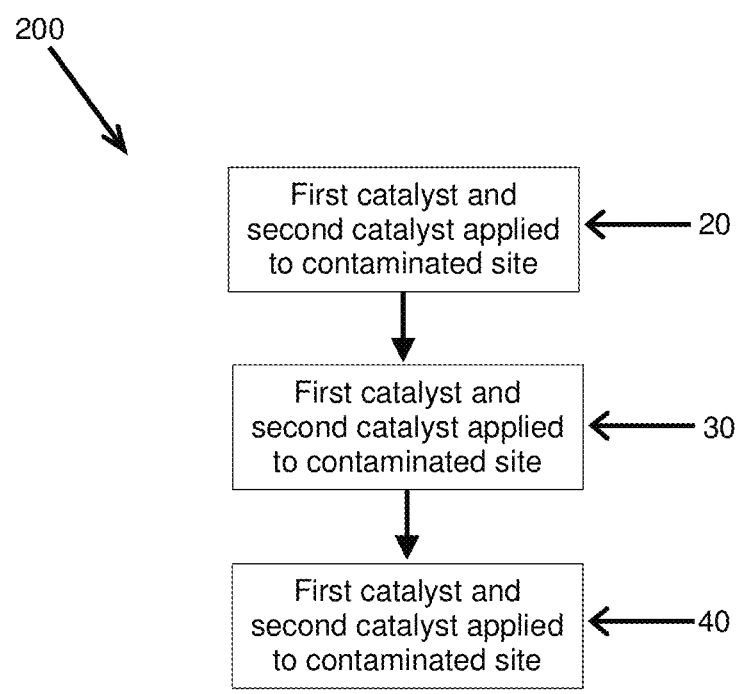
FIG. 2 illustrates a flowchart of a method for restoring a contaminated site according to an embodiment of the present invention.

In FIG. 2 there is shown a flowchart of a method for restoring a contaminated site 200 according to an embodiment of the invention.

During a primary amendment of the contaminated site, the first catalyst and the second catalyst are applied to at least a portion of the contaminated site 20. Preferably, the at least a portion of the contaminated site to be amended during primary amendment may be randomly selected. It is envisaged that the first catalyst and the second catalyst will be thinly and randomly spread during the primary amendment of the contaminated site, such that it results in a random distribution of the catalysts across the contaminated site, wherein each contact point between the catalysts and the soil becomes a biological energy generation point. Preferably, the application of the catalysts across the contaminated site during the primary amendment constructs a matrix of biological energy generation points on about 5% of the contaminated site by area.

During a secondary amendment of the contaminated site, the first catalyst and the second catalyst are applied to at least a portion of the contaminated site 30. Preferably, the at least a portion of the contaminated site to be amended during secondary amendment includes the portion of the contaminated site amended during the primary amendment of the contaminated site. It is envisaged that each contact point between the catalysts and the soil becomes a biological energy generation point. Preferably, the application of the catalysts across the contaminated site during the secondary amendment constructs a matrix of biological energy generation points on about 20% of the contaminated site by area.

During a tertiary amendment of the contaminated site, the first catalyst and the second catalyst are applied to at least a portion of the contaminated site 40. Preferably, the at least a portion of the contaminated site to be amended during tertiary amendment includes the portion of the contaminated site amended during the primary amendment and the secondary amendment of the contaminated site. It is envisaged that each contact point between the catalysts and the soil becomes a biological energy generation point. Preferably, the application of the catalysts across the contaminated site during the tertiary amendment constructs a matrix of biological energy generation points on about 75% of the contaminated site by area.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

Figure 3:
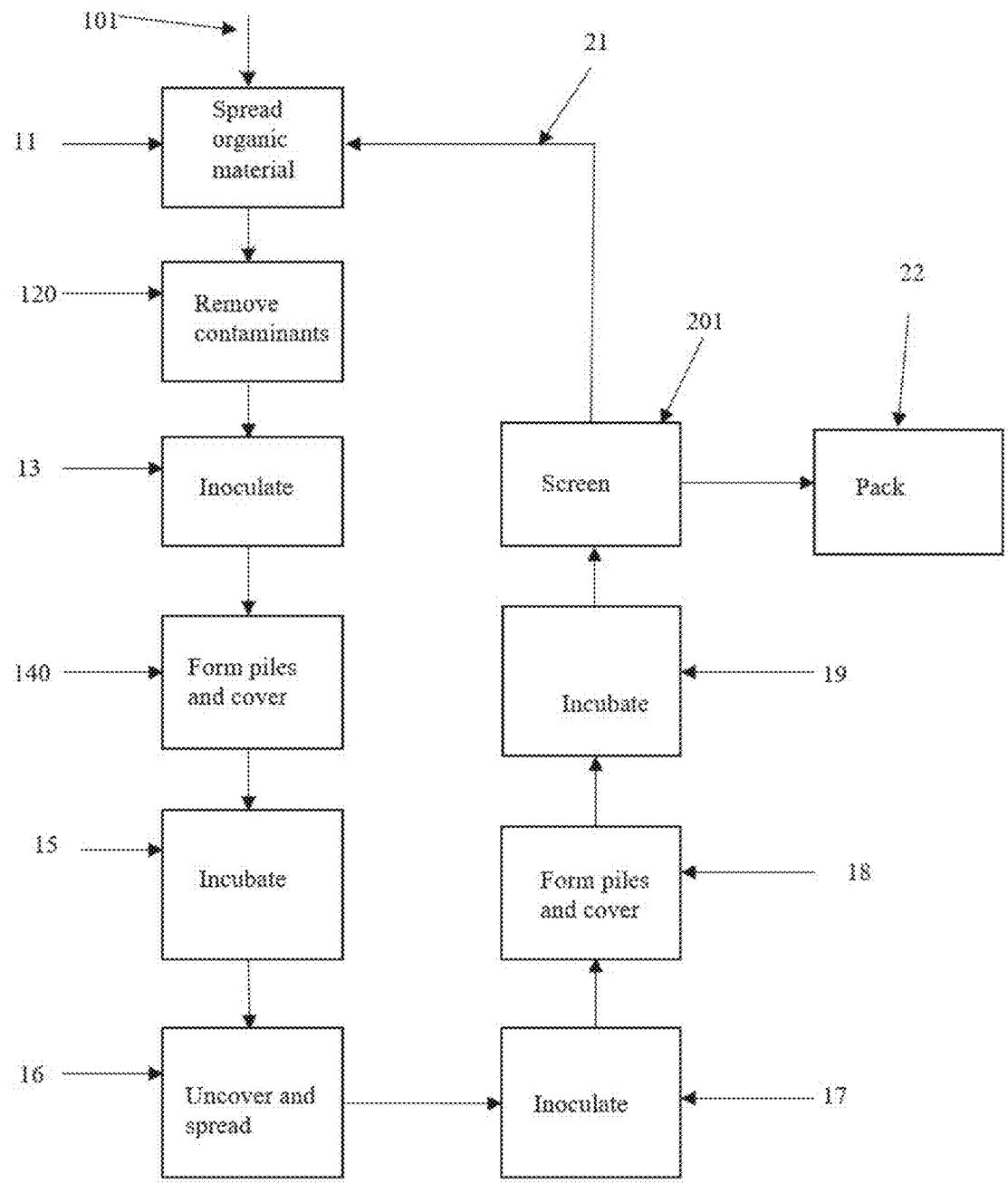
FIG. 3 illustrates a flowchart of a method for the conversion of organic material according to an embodiment as described in Australian Patent No. 2014250680, which is incorporated herein by reference.

Portion of Description of Embodiments of Australian Patent No. 2014250680, Incorporated Herein by Reference In FIG. 3 there is shown a flowchart of a method for the conversion of organic material according to an embodiment of the present invention.

In this Figure, organic material is collected and transported 101 to the site at which the method will be performed. The organic material (or blend of organic materials) is spread out 11 so that any contaminants in the organic material may be removed 120. Spreading of the organic material is achieved using vehicles such as a loader, Bobcat™, or the like. The purpose of spreading the organic material is to make identifying and removing contaminants from the organic material simple and fast.

It is envisaged that the organic material will be spread so as to form a layer of between about 300 mm and 1000 mm in depth, more preferably between about 300 mm and 500 mm in depth. This depth is preferred as it is shallow enough to allow for identification and removal of contaminants (where present) without requiring excessive labour in spreading the organic material too thinly.

Preferably, the organic material contains a mixture of dry carbon-based material (such as wood, chipped pallets etc.), along with material containing more moisture (leaves, sludge cake, grass clippings etc.).

Removal of contaminants may be achieved manually or through an automated process such as screening, magnetic separation or the like, or a combination thereof.

Once contaminants have been removed from the organic material, the organic material is inoculated 13 with an inoculant comprising a mixture of aerobic micro-organisms and anaerobic micro-organisms, at least a portion of which comprise photosynthetic micro organisms. In this embodiment of the invention, the inoculant comprises approximately 50% aerobic micro-organisms and approximately 50% anaerobic micro-organisms, and about 50% of the total micro-organisms in the inoculant are photosynthetic micro-organisms. It is preferred that the layer of organic material is relatively thin so that the addition of inoculant allows good contact with the organic material with minimal or no mechanical mixing.

In the embodiment of the invention illustrated in FIG. 3, two inoculants are added to the organic material during inoculation. The first inoculant comprises the inoculant described above, while the second inoculant comprises approximately 90% v/v trace minerals and vitamins and approximately 10% v/v bio-detergents.

The quantity of each of the two inoculants used will depend on the type of organic matter being inoculated. For instance, for organic materials containing manures or bio-solids or other wet organic inputs, approximately 1 litre of each of the two inoculants is applied for each approximately 10 m$^3$ of organic material. On the other hand, if the organic material comprises only green waste, dry leaves, chipped wood or similar materials, approximately 0.5 litres of each of the two inoculants is applied for each approximately 10 m$^3$ of organic material.

The two inoculants may be combined in a single container and diluted with water at a ratio of approximately 1:1:10 (first formulation:second formulation:water) for application to the organic material (for instance, by spraying).

The inoculants should be of a type capable of fostering and maintaining a preponderance of bacterial photosynthetic activity together with lactic acid production and a wide range of fungal activity. In particular, it is preferred that the selection of inoculants used should result in the formation of a population of grey-coloured aerobic fungal activity which display purple pigmentation under microscopic examination.

During inoculation 13, water content of the organic material must be adjusted to approximately 60% w/w. The relatively high moisture content of the inoculated organic material ensures that circulation of the micro-organisms within the organic material is possible without the need for mechanical mixing.

Preferably, the organic material comprises at least 30% w/w water prior to the addition of the diluted inoculant.

Once inoculated, the organic material is formed into piles 140. This is achieved using one or more load-shifting machines, such as a backhoe, front end loader, tractor, Bobcat™ or the like.

Piles should be formed so that their height is equal to or greater than approximately 1.8 m (typically between about 2 m and 5 m). It is envisaged that a depression will be included roughly the centre of the top of each pile, the depression being a minimum of 200 mm from the top of the highest peak either side of the depression. The depression may be of any suitable shape, although in some embodiments a V- or U-shaped depression may be formed in the upper surface of the pile. In situations in which windrows are formed, it is preferred that the depression extends substantially along the entire length of the windrow. Ideally, a hose for adding water to the pile should be placed in the depression under the covers used to cover the pile.

The covers should be weighted to allow the depression to be outlined, and to form a seal around the pile to substantially maintain the level of moisture within the pile (i.e. to substantially preclude the loss of water from the pile). The depression should not be allowed to remain full of water above the covers (i.e. to allow drainage of the depression to either end of the pile).

The purpose of the depression is to create the conditions for the convection of water inside the covered pile so that a circulation of water and water vapour moves through the pile driven by internal and external temperature gradients.

The covers should completely seal the pile from external contact or contamination and should be fabricated from a material which will prevent water egress or ingress.

Once the piles have been formed and covered, incubation 15 occurs. The initial incubation period is between 6 and 12 weeks. During incubation, moisture content and temperature of the pile should be monitored. A moisture level of approximately 40% w/w should be maintained in the pile. The moisture content may be maintained through the addition of water to the pile.

At the completion of the initial incubation period, the piles are uncovered and spread 16. The spreading of the piles is generally conducted so that a layer of organic material is formed with a depth of between about 500 mm and 600 mm.

The organic material is inoculated 17 for a second time, the inoculation process being substantially identical to the initial inoculation process 13. After the organic material has been inoculated 17 for a second time, piles are again formed and covered 18. The process for forming the piles is substantially identical to the initial pile forming process 140. The second inoculation 17 is important to create a generational dominance change towards phototrophic organisms.

After piles have been formed, further incubation 19 takes place. The incubation process 19 is substantially the same as the initial incubation process 15, except that the further incubation 19 is generally 14 to 20 weeks in length, although it is envisaged that the further incubation 19 could be carried out for up to 30 weeks or more.

At the completion of the further incubation 19, the piles are uncovered and are screened 201. Any screen size may be used, although in the embodiment of the invention shown in FIG. 3, the organic material is screened at both 20 mm and 5 mm so that three size fractions are produced. The fraction of the organic material that is less than 5 mm in size is used as a high value humus rich soil ameliorant, while the fraction of the organic material in the 5 mm to 20 mm range is used as animal bedding, a potting mix additive, general mulch cover and so on.

Particles over 20 mm in size are checked for inorganic contaminants and, if present, these are removed. All remaining organic material is returned 21 to the start of the process to act as a partial inoculant for subsequent organic material treatment.

The products in the under 5 mm particle size range and 5 mm to 20 mm size range are packed 22 for transportation and eventual use. Any suitable packing technique and material may be used, although it is preferred that the packing material should provide at least some protection from water ingress and water egress.

Figure 4:
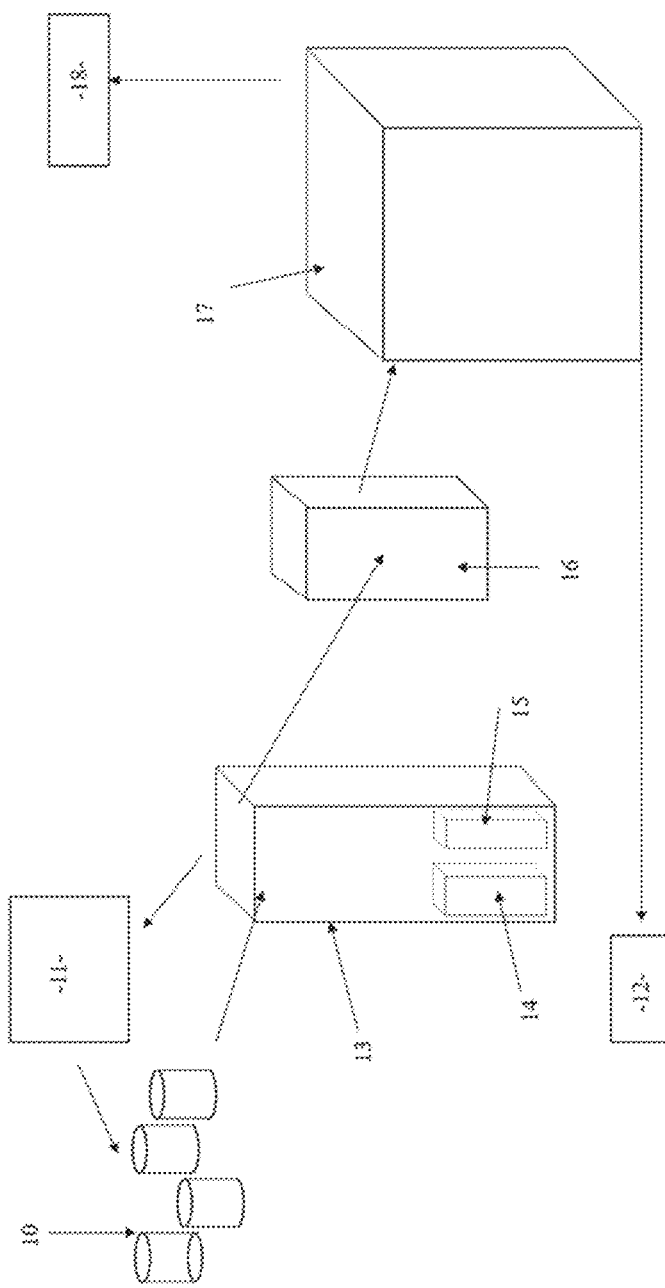
FIG. 4 illustrates a flow diagram of a waste conversion process according to an embodiment as described in Australian Patent No. 2012283757, which is incorporated herein by reference.

Portion of Description of Embodiments of Australian Patent No. 2012283757, Incorporated Herein by Reference In FIG. 4 there is illustrated a flow diagram of a waste conversion process according to an embodiment of the present invention. Illustrated in this Figure are a number of containers 10 in the form of buckets for the collection and transportation of organic material to a waste conversion apparatus. In the embodiment of the invention shown in FIG. 4, the containers 10 whose contents have already been dispensed into the apparatus are washed in a washing facility 11. In the washing facility 11, inoculant is added to the water, meaning that the organic material collected in the containers 10 is pre-inoculated. This is done in part to suppress odours arising from the organic material, and also to enhance the production of the output product 12.

Organic material is fed into a size reduction process 13 and is mixed with water 14 and inoculant 15. Once the size of the organic material has been reduced to the desired size, the size reduced and inoculated organic material is fed to a maceration and mixing process 16.

Once maceration is completed, the inoculated organic material is transferred to an incubation process 17. The incubation process 17 is conducted in a static (i.e. non agitated), vented vessel or chamber. If necessary or desired, gases 18 may be extracted from the incubation process for use, for instance in the generation of electricity.

After a suitable period of time (and the length of time will depend on the type of inoculant used, the type and amount of organic material used, the size of the size reduced organic material, the ambient conditions and so on) the output product 12 is removed from the incubation process 17 and used for fertilizer, fuel, as a collected substrate for energy generation and so on.

Figure 5:
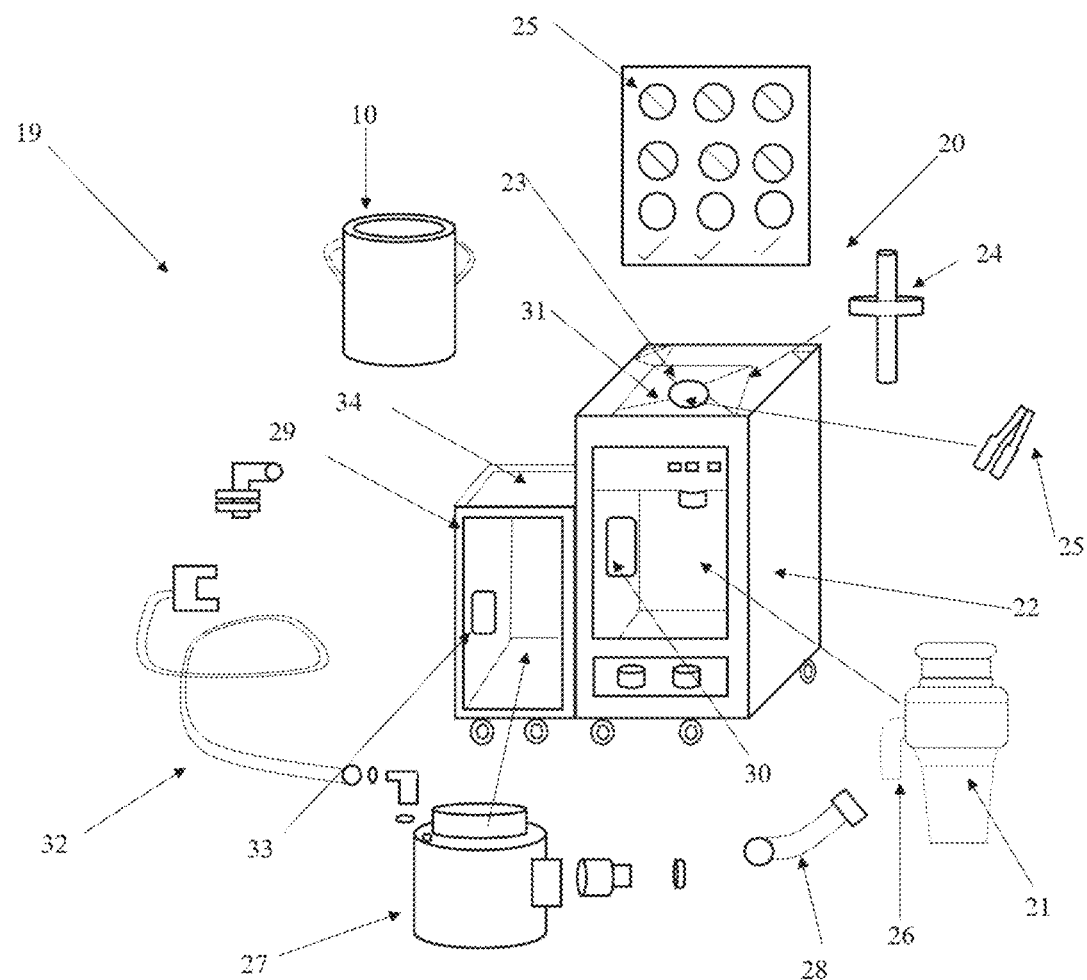
FIG. 5 illustrates an exploded view of a waste conversion apparatus according to an embodiment as described in Australian Patent No. 2012283757, which is incorporated herein by reference.

In FIG. 5 there is shown an exploded view of a waste conversion apparatus 19 according to an embodiment of the present invention. The apparatus-19 comprises a size reduction portion 20 comprising a grinding unit 21 that is housed within a first housing 22. Organic material is fed into the grinding unit 21 through an aperture 23 in an upper surface 31 of the first housing 22, with the aperture 23 being in communication with the grinding unit 21. Tools such as a plunger 24 and tongs 25 are provided to assist in forcing organic material into and through the grinding unit 21, for instance if the organic material becomes stuck in the grinding unit 21. It is also envisaged that, in commercial or domestic applications, the apparatus 19 will be provided with a poster 25 or instruction sheet that sets out details of how to use the apparatus 19 and/or the types of matter that should and should not be placed in the grinding unit 21. It is envisaged that the poster 25 will be displayed on a wall or other surface adjacent the apparatus 19.

The upper surface 31 of the first housing 22 is sloped downwards towards the aperture 23 in order to assist in ensuring the organic material flows towards the aperture 23. In addition, the sloped upper surface 31 allows for the upper surface 31, to be washed down easily after use.

The outlet 26 of the grinding unit 21 is connected to a pump 27 via hose 28 that passes through an aperture 30 in the wall of the first housing 22 as well as a corresponding aperture in the wall of a second housing 29. The pump 27 is housed within the second housing 29 which, in the embodiment of the invention illustrated in FIG. 5, is separate to the first housing 22.

The pump 27 pumps the size reduced and inoculated organic material to either a maceration portion (not shown) or an incubation portion (not shown) via hose 32 that exits the second housing 29 through an aperture 33 in the wall thereof.

The upper surface 34 of the second housing 29 is provided with a substantially flat region in which a container 10 for the collection of organic material may be stored when not in use or prior to emptying its contents into the grinding unit 21.

Figure 6:
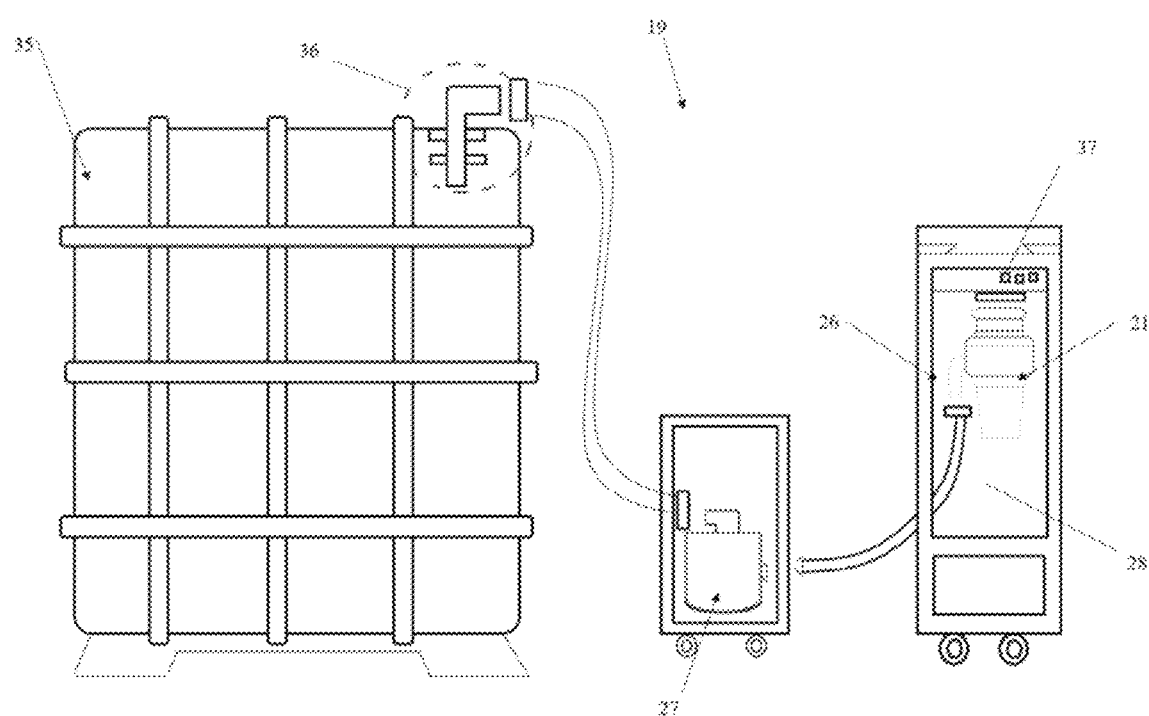
FIG. 6 illustrates a schematic view of a waste conversion apparatus according to an embodiment as described in Australian Patent No. 2012283757, which is incorporated herein by reference.

In FIG. 6 there is shown a schematic view of a waste conversion apparatus 19 according to an embodiment of the present invention. In this Figure it may be more clearly seen that the outlet 26 of the grinding unit 21 is connected to the pump 27 by hose 28. A series of controls 37 are provided on the first housing 21 for switching the apparatus on and off, operating the grinding unit 21 and/or the pump 27 and so on.

The outlet of the pump 27 is connected to the incubation portion 35 (in the form of a clear or semi-opaque tank) via hose 32. In the embodiment of the invention shown in FIG. 6, a fitting 36 is inserted into an upper region of the incubation portion 35 to allow a flow of organic material through the hose 32 and into the incubation portion 35.

It is envisaged that the incubation portion 35 will include a tap, stopcock, valve or the like (not shown) through which the output material may be removed from the incubation portion 35 for use.

CITATION LIST

Kenneth Bellamy, 'Photosynthesis: Fixing carbon and making water' (2009) <https://nanopdf.com/download/photo-synthesis-fixing-carbon-and-making-water-6co2-12h2o_pdf>.

The invention claimed is:

1. A method for restoring a contaminated site, the method consisting of the steps:
    developing an amended contaminated site by:
        undertaking a primary amendment of soil in a contaminated site, wherein the step of undertaking the primary amendment of the soil in the contaminated site consists of applying a first catalyst, a second catalyst, and optionally a third catalyst to the soil in the contaminated site, wherein the first catalyst, the second catalyst, and optionally the third catalyst are applied to a first portion of the soil in the contaminated site such that a first matrix of biological energy generation points are constructed on 5% or less of the contaminated site by area;
        undertaking a secondary amendment of the soil in the contaminated site, wherein the step of undertaking the secondary amendment of the soil in the contaminated site consists of applying the first catalyst, the second catalyst, and optionally the third catalyst to the soil in the contaminated site, wherein the first catalyst, the second catalyst, and optionally the third catalyst are applied to a second portion of the soil in the contaminated site such that a second matrix of biological energy generation points are constructed on 20% or less of the contaminated site by area, and wherein the second portion of the contaminated site comprises the first portion of the contaminated site; and undertaking a tertiary amendment of the soil in the contaminated site, wherein the step of undertaking the tertiary amendment of the soil in the contaminated site consists of applying the first catalyst, the second catalyst, and optionally the third catalyst to the soil in the contaminated site, wherein the first catalyst, the second catalyst, and optionally the third catalyst are applied to a third portion of the soil in the contaminated site such that a third matrix of biological energy generation points are constructed on 75% or less of the contaminated site by area, and wherein the third portion of the contaminated site comprises the second portion of the contaminated site and the first portion of the contaminated site, wherein biological energy is generated in the first matrix, the second matrix, and the third matrix of biological energy generation points by capturing solar energy outside a spectral range used by plants and subsequently storing the solar energy in the soil of the contaminated site as an organic molecule, wherein the soil in the contaminated site has at least one of acidity, alkalinity, or sodic contamination, wherein the first catalyst consists of a humified soil prepared from continuous fermentation of a first organic material, the second catalyst consists of a liquid fertiliser prepared from continuous fermentation of a second organic material, and the third catalyst is a liquid generated by biological hydrosynthesis at least one of in or on the amended contaminated site, wherein the first catalyst and the second catalyst stimulate activity of one or more prokaryotic organisms in the first matrix, the second matrix, and the third matrix of the biological energy generation points to convert the organic molecule to water and one or more compounds rich in hydrogen, thereby resulting in formation of a second humified soil having an excess of soil moisture, the excess of soil moisture increasing at least one of water flow in the second humified soil or movement of water in a water table associated with the contaminated site, and wherein increasing the at least one of the water flow in the second humified soil or the movement of water in the water table associated with the contaminated site and formation of the one or more compounds rich in hydrogen together improve a capacity of the soil in the contaminated site to balance hydrogen compounds by at least one of reducing excessive acidity and alkalinity of the soil in the contaminated site, improving hydrogen exchange between biotic and abiotic sources, or reducing the sodic contamination of the soil in the contaminated site.

2. A method for restoring a contaminated site according to claim 1, wherein a total amount of the first catalyst applied during the primary amendment, the secondary amendment, and the tertiary amendment is at least 400 kilograms per hectare annually and a total amount of the second catalyst applied during the primary amendment, the secondary amendment, and the tertiary amendment is at least 5 litres per hectare annually.

3. A method for restoring a contaminated site according to claim 1, wherein at least one of undertaking the primary amendment, undertaking the secondary amendment, or undertaking the tertiary amendment of the soil in the contaminated site consists of applying the first catalyst, the second catalyst, and optionally the third catalyst to at least one of a contiguous atmosphere above a surface of the contaminated site or a feature on the surface of the contaminated site.

4. A method for restoring a contaminated site according to claim 3, wherein the feature on the surface of the contaminated site is vegetation.

5. A method for restoring a contaminated site according to claim 1, wherein amending the contaminated site with the first catalyst and the second catalyst supports development and health of a soil microbiome.

6. A method for restoring a contaminated site according to claim 1, wherein at least one of undertaking the primary amendment, undertaking the secondary amendment, or undertaking the tertiary amendment at least one of balances the acidity or alkalinity of the amended contaminated site or reduces an impact on plant growth of excessive sodicity of the amended contaminated site.

7. A method for restoring a contaminated site according to claim 1, wherein at least one of undertaking the primary amendment, undertaking the secondary amendment, or undertaking the tertiary amendment assists in absorbing and managing contaminants, including contamination arising from an imbalance in at least one of hydrogen ions or sodicity.

8. A method for restoring a contaminated site according to claim 1, wherein at least one of undertaking the primary amendment, undertaking the secondary amendment, or undertaking the tertiary amendment supports biological hydrosynthesis, wherein at least one of the excess of soil moisture or increased water storage capacity in the amended contaminated site acts as at least one of a hydrogen or salt buffer.

* * * * *